(12) United States Patent
Avila Gonzalez et al.

(10) Patent No.: US 7,940,659 B2
(45) Date of Patent: May 10, 2011

(54) DEVICES AND METHOD FOR GUARANTEEING QUALITY OF SERVICE PER SERVICE DATA FLOW THROUGH THE BEARER LAYER

(75) Inventors: Victor Manuel Avila Gonzalez, Madrid (ES); Guadalupe Sanchez Santiso, Madrid (ES); Ana Maria Lopez Nieto, Madrid (ES); Maria Belen Pancorbo, Madrid (ES); Jose Javier Pastor Balbas, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 286 days.

(21) Appl. No.: 12/303,241

(22) PCT Filed: Jun. 2, 2006

(86) PCT No.: PCT/SE2006/050184
§ 371 (c)(1),
(2), (4) Date: Dec. 2, 2008

(87) PCT Pub. No.: WO2007/142565
PCT Pub. Date: Dec. 13, 2007

(65) Prior Publication Data
US 2009/0196225 A1    Aug. 6, 2009

(51) Int. Cl.
*H04L 1/00*         (2006.01)
*H04W 28/00*     (2009.01)
(52) U.S. Cl. .................................. 370/230; 370/328

(58) Field of Classification Search .................. 370/229, 370/230, 230.1, 231, 232, 235; 709/223, 709/224, 225, 226, 227, 232; 455/452.2
See application file for complete search history.

(56) References Cited

U.S. PATENT DOCUMENTS

| | | | |
|---|---|---|---|
| 7,483,989 B2 * | 1/2009 | Williams et al. | 709/227 |
| 7,546,376 B2 * | 6/2009 | Widegren et al. | 709/232 |
| 2001/0027490 A1 * | 10/2001 | Fodor et al. | 709/238 |
| 2002/0036983 A1 * | 3/2002 | Widegren et al. | 370/230.1 |
| 2003/0172160 A9 * | 9/2003 | Widegren et al. | 709/226 |
| 2009/0215454 A1 * | 8/2009 | Przybysz et al. | 455/435.1 |

* cited by examiner

*Primary Examiner* — Chi H Pham
*Assistant Examiner* — Robert Lopata

(57) ABSTRACT

In scenarios where the quality of service is negotiated through a signalling layer whereas the services are actually carried through a bearer layer, application functions at the signalling layer are not always aware of how quality of service is individually accomplished at the bearer layer on a service basis. The invention provides a method and devices whereby events are detected on a service data flow basis at a detection device in the bearer layer and notified towards an application device in the signalling layer via a control device between the signalling and the bearer layer. The list of events to be notified is obtainable at the control device from the application device and is included in Quality of Service related rules, along with service data flow filters. This Quality of Service related rules are provided to the detection device for inspecting individual service data flows in order to detect and notify the indicated events.

8 Claims, 8 Drawing Sheets

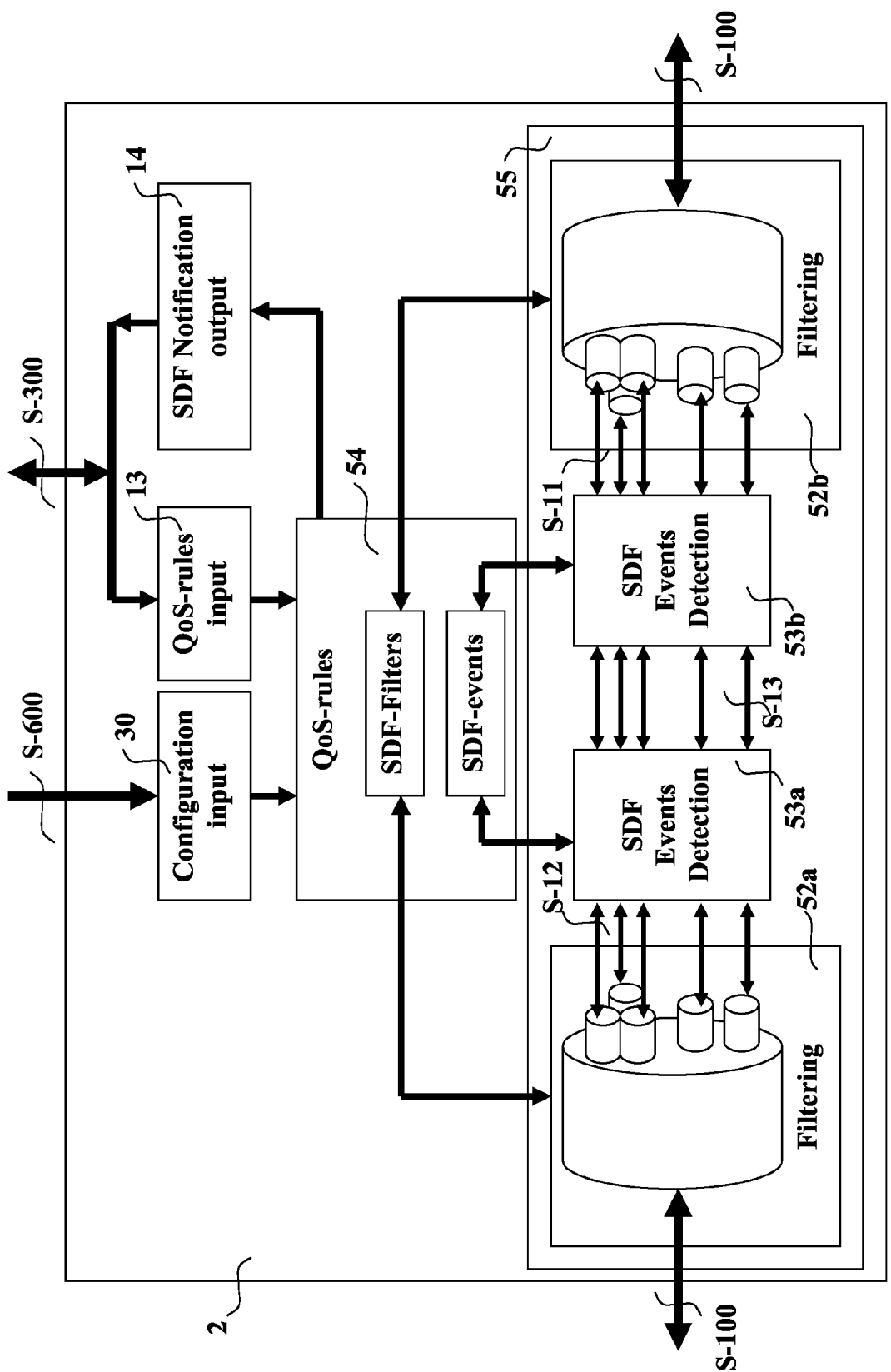
FIG.-6-

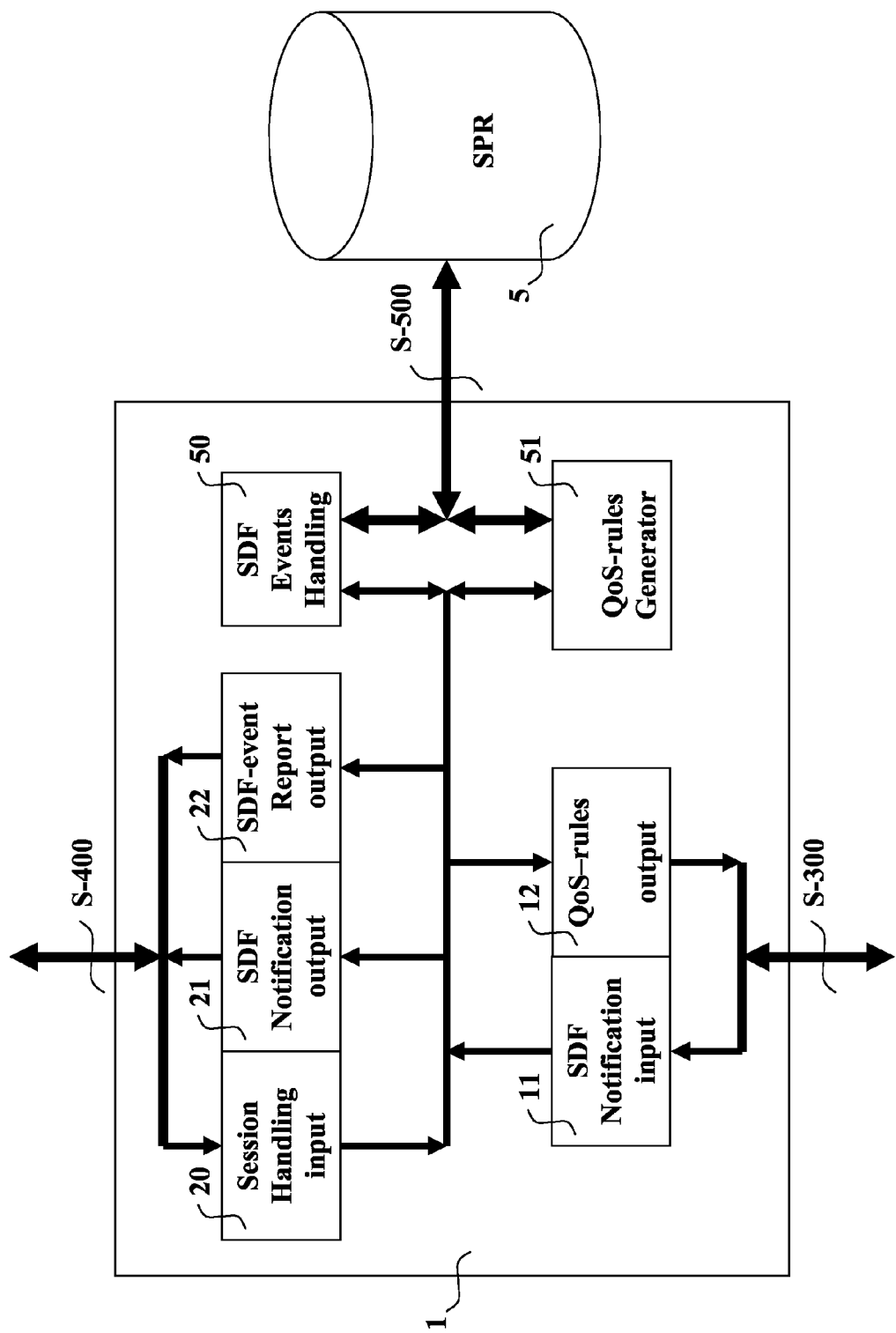
FIG.-7-

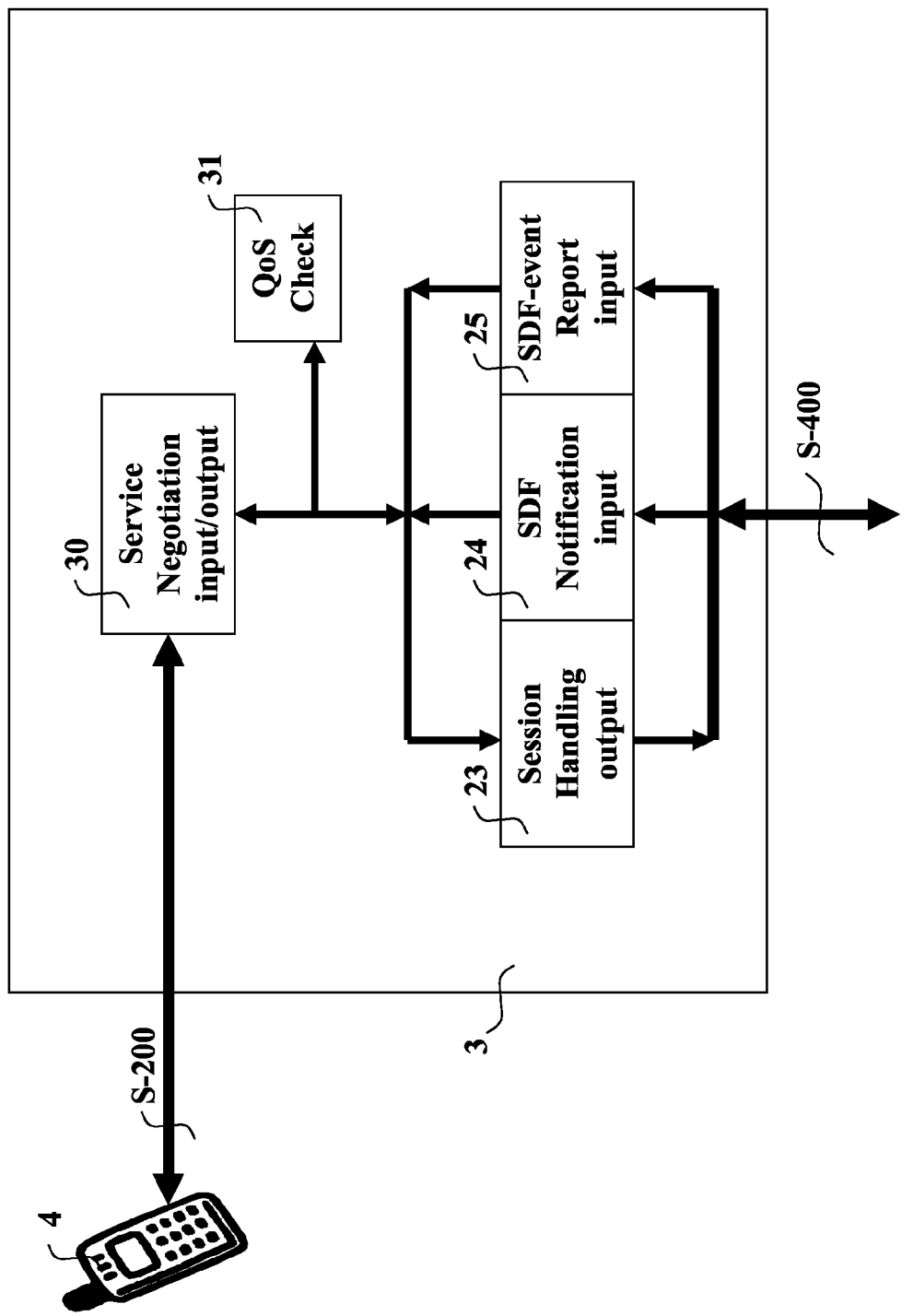
FIG.-8-

DEVICES AND METHOD FOR GUARANTEEING QUALITY OF SERVICE PER SERVICE DATA FLOW THROUGH THE BEARER LAYER

TECHNICAL FIELD

The present invention generally relates to Quality of Service negotiated through a signalling layer, whereas said services are actually carried through a connectivity or bearer layer. In particular, the invention may be applied where the bearer layer is capable of bearing a plurality of service data flows for one or more services.

BACKGROUND

There are scenarios where a user with a user's equipment can negotiate with a telecommunication network, via a signalling layer, requirements on quality of service (hereinafter QoS) for a number of services, which are in fact carried through a separate bearer or connectivity layer provided by an access network.

For instance, a first scenario may be where the user negotiates requirements on QoS with an IP Multimedia Subsystem (hereinafter IMS), as specified in 3GPP TS 23.228 V7.3.0, whereas the services are actually carried through a General Packet Radio Service (GPRS) connectivity layer. In this first scenario, a proxy Call Session Control Function (hereinafter P-CSCF) is an entry point to the IMS and is located at the control plane thus aware of requirements on QoS. On the other hand, the bearer layer in this first scenario is built up through a connection path established between the user's equipment (hereinafter UE), a Serving GPRS Support Node (hereinafter SGSN), and a Gateway GPRS Support Node (hereinafter GGSN).

A second scenario may be where the user negotiates requirements on QoS with a streaming server for video download services, whereas the services are actually carried through a Wireless Local Area Network (WLAN) connectivity layer. In this second scenario, the streaming server is the entity in charge of negotiating the requirements on QoS with the UE, and is located at the control plane; whereas the bearer layer is built up through a connection path between the UBE a WLAN Access Point (hereinafter WLAN AP), a WLAN Access Gateway (hereinafter WAG), and a Packet Data Gateway (hereinafter PDG).

New scenarios might be apparent by having different combinations of signalling layer at the control plane with bearer layer at the traffic plane.

In this context, a bearer or connectivity layer is a media transport, capable of carrying a plurality of Internet Protocol (hereinafter IP) flows, and takes place at the traffic plane. An IP flow is a unidirectional flow of IP packets with the same source IP address and port number, the same destination IP address and port number and the same transport protocol. An IP flow is thus used to transmit IP packets between an origin and a destination. Each IP flow may be associated with a service, and several IP flows may be associated with the same service. For the purpose of the present invention, a service is represented by at least one service data flow (hereinafter SDF) which consists of one or more IP flows.

A common architecture called Policy and Charging Control (hereinafter PCC) is nowadays developed under 3GPP TS 23.203 V0.4.0, which is supposedly addressing all different types of access networks.

In accordance with 3GPP TS 23.203, this PCC includes a Policing and Charging Enforcement Function (hereinafter PCEF) in charge of SDF detection, policing enforcement and charging functionality. The PCEF is included in the traffic plane and supports the connectivity or bearer layer between originating and destination user equipments.

Also in this PCC architecture, there is a Policing and Charging Rules Function (hereinafter PCRF) in charge of providing network control for the above SDF detection, policing enforcement decision-based and charging decision-based functionality, as well as for QoS. This PCRF is preferably located in an intermediate entity enabled to communicate with a server in the control plane and with the above PCEF in the traffic plane.

Apart from the PCEF and PCRF, the PCC architecture also includes an application function (hereinafter AF) for offering applications that require control of the IP bearer resources. In particular, the AF may reside in or be an integral part of a server in the control plane aware of negotiated requirements on QoS. The AF communicates with the PCRF to transfer dynamic session information required for PCRF decisions.

The basic PCC architecture described hereinbefore is suitable for being applied in scenarios where services are negotiated through the signalling layer, between the user equipments and servers in the control plane; whereas said services are actually carried through the connectivity or bearer layer, between originating and destination user equipments. In such scenarios, the PCRF makes decisions to enforce what has been negotiated through the signalling layer into the connectivity layer and, in the other way around, the PCRF must advertise the signalling layer of any relevant event in the connectivity layer that might affect the desired quality of any such service. However, PCC architecture is not able to detect any change on the status of each particular media used per SDF basis.

SUMMARY

At present, the PCRF is only aware of mismatching any QoS-related condition, which had been previously negotiated between the user equipment and the AF, when the whole bearer is not available. That is, where some QoS-related condition is not satisfied, the PCEF can just notify unavailability of the bearer to the PCRF. In particular, when the bearer layer is provided by a GPRS access network, the notified failure applies to an indicated PDP context.

However, information about availability of the bearer is not enough where several SDF's are carried on the same bearer. In this situation the PCRF is only advertised when the whole bearer is not available, but not when a particular SDF is not delivered according to the conditions previously negotiated by the UE. This limitation causes that any SDF may be delivered without satisfying the requirements on QoS previously negotiated, and neither the PCRF nor the AF, are advertised of such a circumstance. In these situations, the information related with corresponding services may be wrong at the AF, there could be a waste of resources at the AF, an incorrect charging and, even, a bad experience for the user.

The present invention is aimed to obviate at least some of the above disadvantages and provide an enhanced mechanism for enforcement into the bearer layer of those QoS requirements negotiated by the UE on an SDF basis through the signalling layer as well as for ensuring that any SDF is delivered in accordance with said QoS requirements. Moreover, the present invention seeks an enhanced architecture where the control of service status can be carried out independently from the whole bearer status and the control of service can be carried out independently from the access network.

To achieve this, the present invention proposes the detection of any event at a detection function device on an SDF basis, and notification of such event on an SDF basis between the detection function device and a QoS control function device, as well as between the QoS control function device and an application function device. With this finer granularity control, the application function device can take proper actions per specific service; for example, to stop a particularly affected application and to trigger corrective dedicated functions.

In particular, the QoS control function device may be included into, or be integrated with, a PCRF operating in accordance with a 3GPP PCC architecture; or may be provided as a standalone device if QoS control is not wanted to be handled in a same entity as policing and charging. Likewise, the detection function device may be included into, or be integrated with, a PCEF operating in accordance with the 3GPP PCC architecture; or may also be provided as a standalone device.

In accordance with a first aspect of the present invention, there is provided a QoS-control function device for guaranteeing into a bearer layer those requirements on quality of service negotiated through a signalling layer. This QoS-control function device is preferably interposed between the signalling layer and the bearer layer. The bearer layer is a media transport layer capable of bearing several service data flows, and each service data flow may include one or more IP flows. The signalling layer is used for negotiating how the media transported through the bearer layer should be treated.

This QoS-control function device includes:
first input means for receiving a session identifier along with a description of media negotiated for a service data flow from an application function device located in the signalling layer;
second input means for receiving a notification from a detection function device when an event related to a particular service data flow is detected;
first processing means for correlating the description of the negotiated media with service data flows in the bearer layer, and for determining the application function device to be notified about the detected event; and
first output means for notifying the application function device in the signalling layer about the detected event related to the particular service data flow.

In accordance with the invention there are provided Quality of Service related rules, which include service data flow filters and lists of events to be notified per service data flow. On the one hand, the Quality of Service related rules may be submitted from the QoS-control function device towards the detection function device. On the other hand, the QoS-control function device may advantageously receive the list of events to be notified from the application function device. To this end, the first input means may be enabled to also receive from the application function device the list of events to be notified per service data flow.

Additionally, the QoS-control function device may further comprise means for collecting in an event report those events notified per service data flow from the detection function device. To this end, the QoS-control function device may further comprise means for submitting the event report to the application function device in the signalling layer.

In accordance with a second aspect of the present invention, there is provided a detection function device for inspecting the media transported through the bearer layer in order to detect events occurred per service data flow basis.

As explained above, the bearer layer is capable of bearing several service data flows, and each service data flow may include one or more IP flows.

This detection function device comprises:
input/output means for transmitting the media;
storage means for installing Quality of Service related rules, the rules including service data flow filters and lists of events to be notified per service data flow;
filtering means for inspecting IP flows through the media by using the service data flow filters stored in the Quality of Service related rules;
detection means for detecting when an event to be notified per service data flow occurs for the inspected IP flows; and
second output means for notifying to the QoS-control function device the detection of an event in the list of events to be notified for a service data flow.

In accordance with an embodiment of the invention, and aligned with corresponding features in an alternative for the above QoS-control function device, the detection function device may further comprise first input means for receiving the Quality of Service related rules from the QoS-control function device. Alternatively or complementary to the reception of QoS related rules from the QoS-control function device, the detection function device may further comprise configuration means for receiving the Quality of Service related rules from a provisioning system.

In accordance with a third aspect of the present invention, there is provided an application function device for submitting those requirements on quality of service negotiated through the signalling layer and to be guaranteed for media transport through the bearer layer. As already commented, the bearer layer is a media transport layer capable of bearing several service data flows and each service data flow may include one or more IP flows.

This application function device comprises:
first output means for submitting a session identifier along with a description of media negotiated for a service data flow towards a QoS-control function device interposed between the signalling layer and the bearer layer; and
first input means for receiving a notification from the QoS-control function device about the detected event related to the particular service data flow.

Additionally, and aligned with corresponding features of the above QoS-control function device, the first output means in this application function device is enabled to also submit a list of events to be notified per service data flow.

As an additional advantage from the cooperation with the above QoS-control function device, the application function device may further comprise second input means for receiving an event report from the QoS-control function device with those events notified per service data flow.

Apart from the above co-operating entities: the QoS-control function device, the detection function device and application function device, there is provided in accordance with a fourth aspect of the invention a method for guaranteeing into the bearer layer those requirements on quality of service negotiated through the signalling layer. Also in this method, the bearer layer is a media transport layer capable of bearing several service data flows, and each service data flow may include one or more IP flows; whereas the signalling layer is used for signalling how the media transported through the bearer layer should be treated.

This method comprises the steps of:
a user equipment negotiating with the signalling layer those requirements on quality of service to be guaranteed for media transport through the bearer layer;

setting a session identifier along with a description of negotiated media to identify the session between signalling and bearer layers;

transmitting the media through the bearer layer;

installing Quality of Service related rules, the rules including service data flow filters and lists of events to be notified per service data flow;

inspecting IP flows through the media at the bearer layer by using the service data flow filters;

detecting at the bearer layer when an event to be notified per service data flow occurs for the inspected IP flows; and notifying towards the signalling layer about the detected event related to the particular service data flow.

Advantageously, the step of setting a session identifier along with a description of negotiated media may comprise in this method a step of receiving service parameters from the application function device in the signalling layer. These service parameters may include requirements on quality of service negotiated for a given service data flow, and may include a list of events to be notified per service data flow.

Moreover, in accordance with one embodiment of the invention, the above step of notifying about the detected event may include a step of notifying to the QoS-control function device the detection at the detection function device of an event in the list of events to be notified for a service data flow; a step of determining the application function device to be notified about the detected event; and a step of notifying the application function device in the signalling layer about the detected event related to the particular service data flow.

Additionally, this method may further comprise a step of collecting in an event report submitted from the QoS-control function device to the application function device those events notified per service data flow from the detection function device. In this case, the method may advantageously include a step of dynamically updating at the application function device the service parameters as a result of this event report.

Alternatively or complementary to the use of the event report for the updating, the method may further comprise a step of dynamically updating at the application function device the service parameters as a result of those events individually notified per service data flow.

BRIEF DESCRIPTION OF THE DRAWINGS

The features, objects and advantages of the invention will become apparent by reading this description in conjunction with the accompanying drawings, in which:

FIG. 6 is a basic block structure presenting the structural elements that a detection function device may comprise in accordance with an embodiment of the invention to accomplish the required functionality at the traffic plane.

FIG. 7 is a basic block structure presenting the structural elements that a QoS-control function device may comprise in accordance with an embodiment of the invention to accomplish the required functionality of a control entity interposed between the traffic plane and the control plane.

FIG. 8 is a basic block structure presenting the structural elements that an application function device may comprise in accordance with an embodiment of the invention to accomplish the required functionality at the control plane.

DETAILED DESCRIPTION

The following describes some preferred embodiments for an enhanced mechanism to enforce into the bearer layer those QoS requirements negotiated by the user's equipment on an SDF basis through the signalling layer as well as for ensuring that any SDF is delivered in accordance with the QoS requirements previously negotiated.

Figure 1:
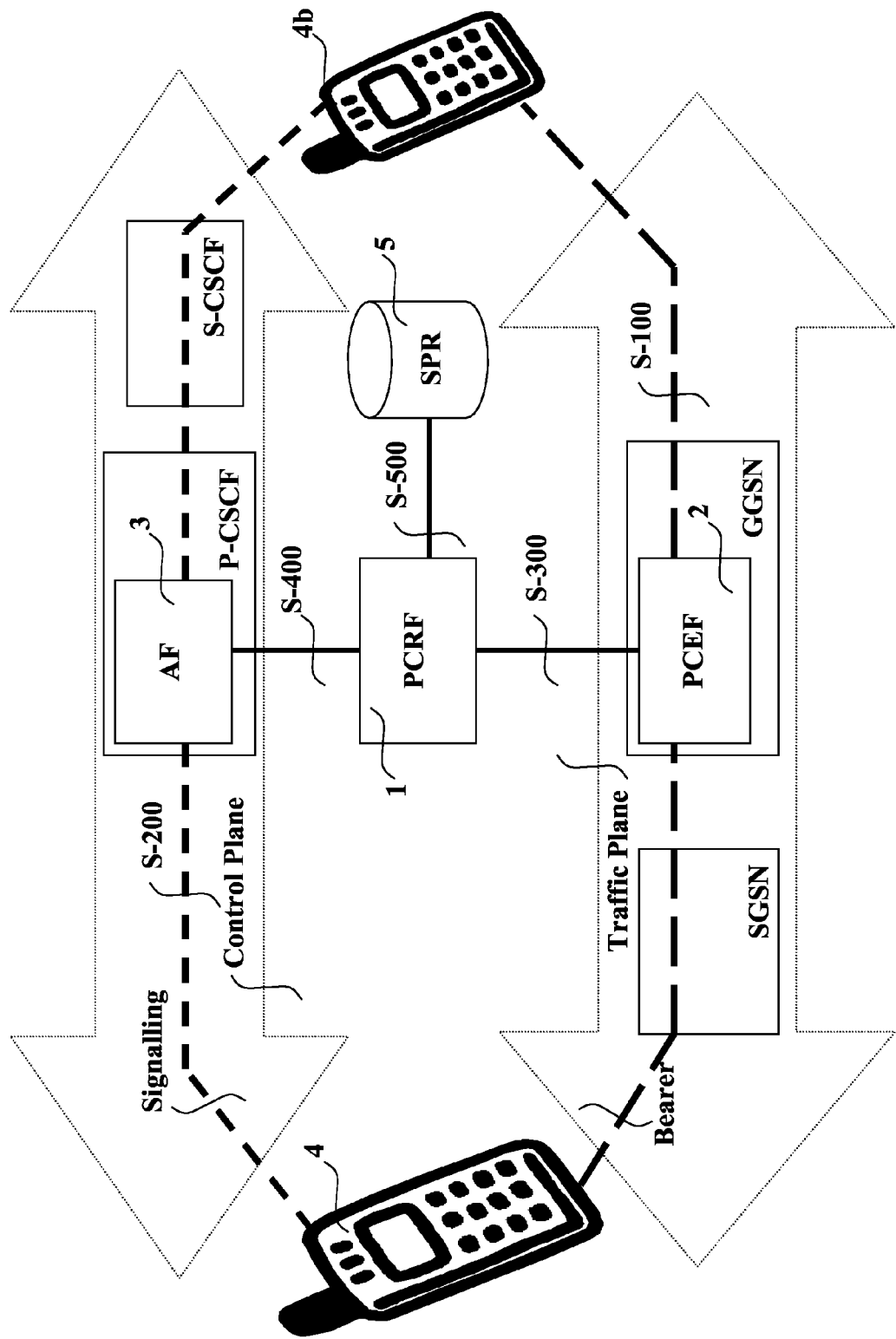
FIG. 1 is a basic block diagram illustrating how the invention fits in a first scenario following a PCC model, where requirements on QoS are negotiated through an IMS signalling layer whilst services are carried on a bearer layer provided by a GPRS access network.
Figure 2:
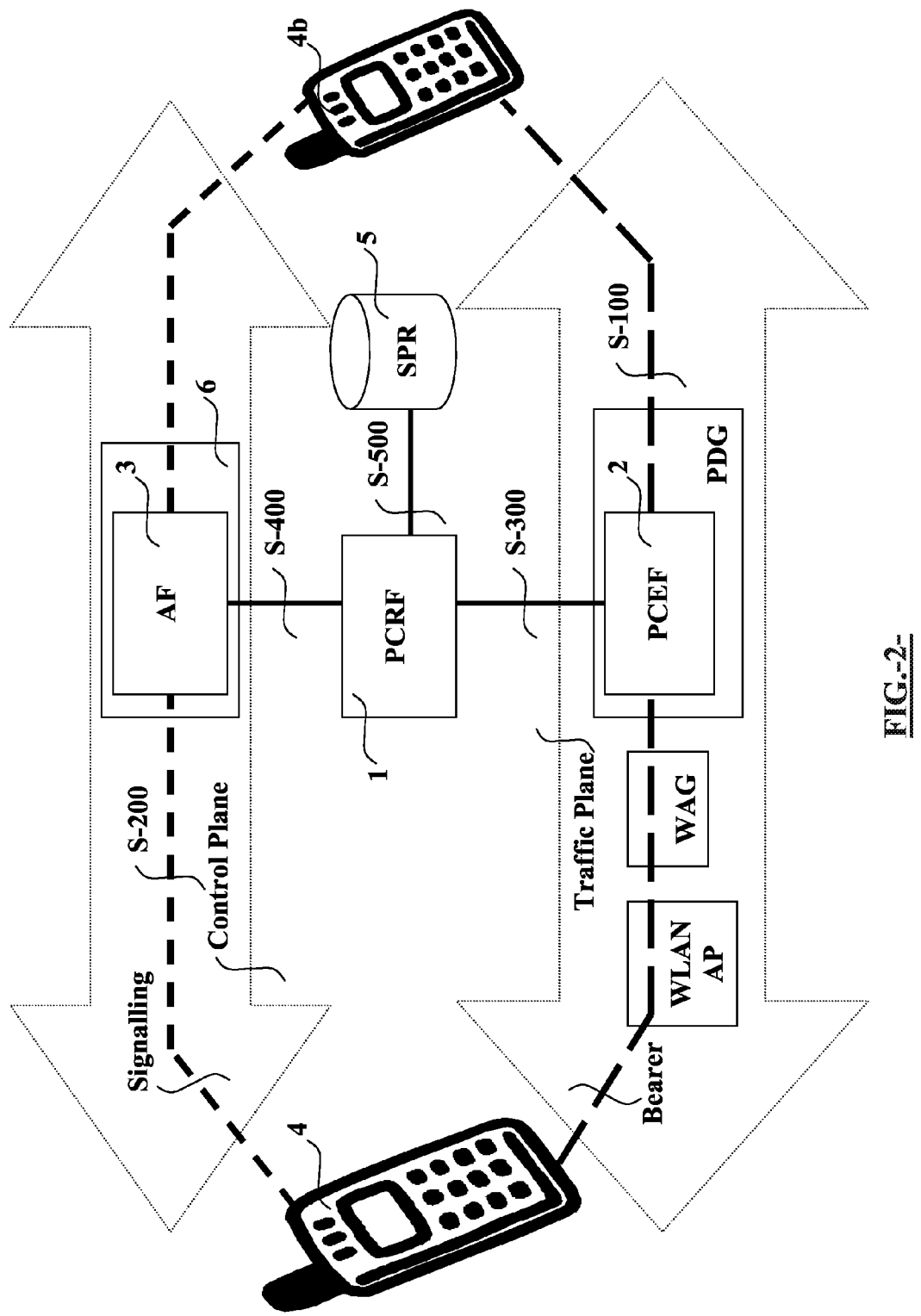
FIG. 2 is a basic block diagram illustrating how the invention fits in a second scenario following a PCC model, where requirements on QoS are negotiated through a generic signalling layer whilst services are carried on a bearer layer provided by a WLAN access network.
Figure 3:
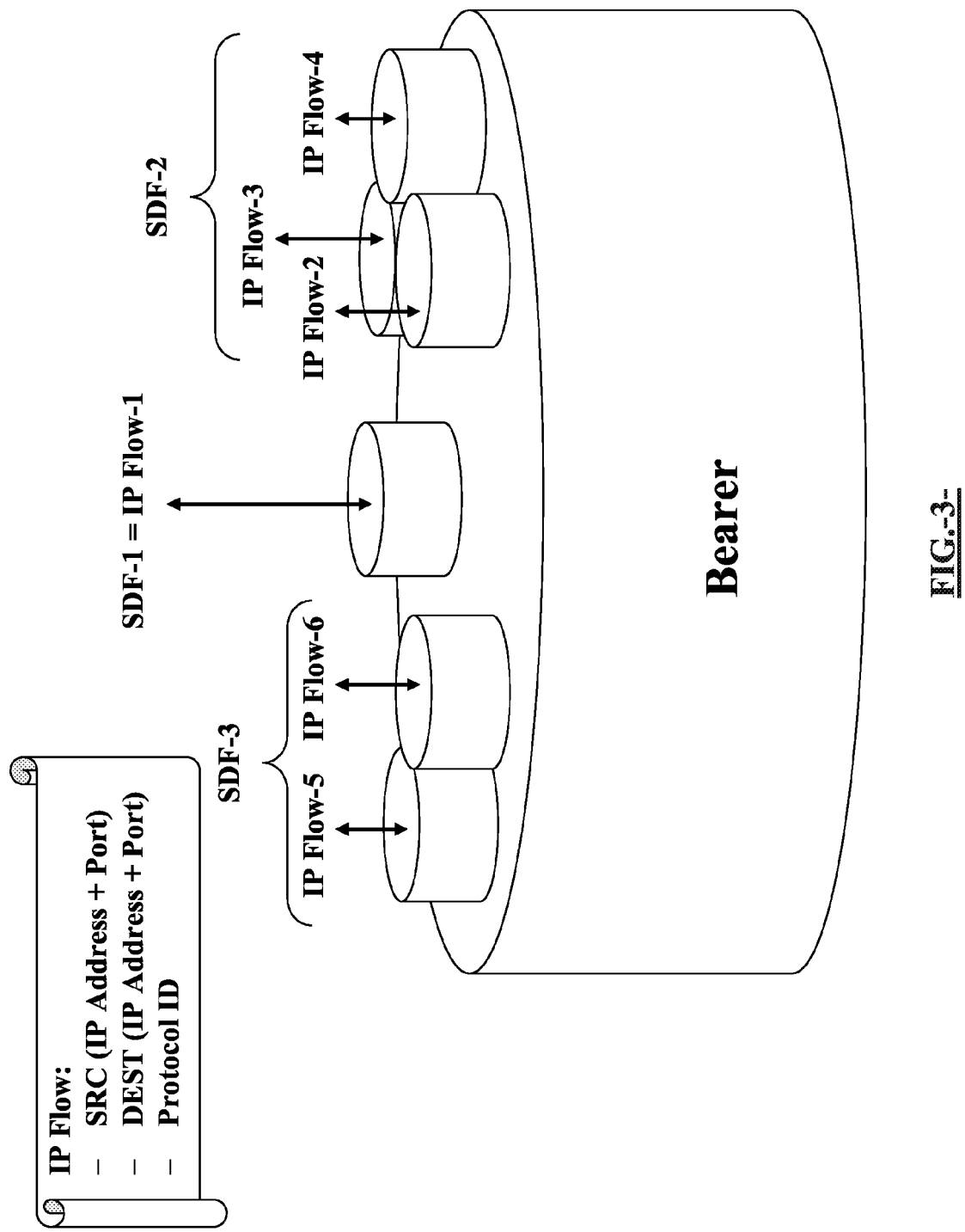
FIG. 3 is a basic diagram illustrating the finer granularity control of requirements on QoS as proposed by the present invention.

There is provided in accordance with the invention a method for guaranteeing into a bearer layer those requirements on quality of service negotiated through a signalling layer. As illustrated in FIG. 3, the bearer layer is a media transport layer capable of bearing several service data flows, SDF-1, SDF-2, and SDF-3, wherein each service data flow may include one or more IP flows, IP Flow-1, IP Flow-2, IP Flow-3, IP Flow-4, IP Flow-5, and IP Flow-6.

Figure 4:
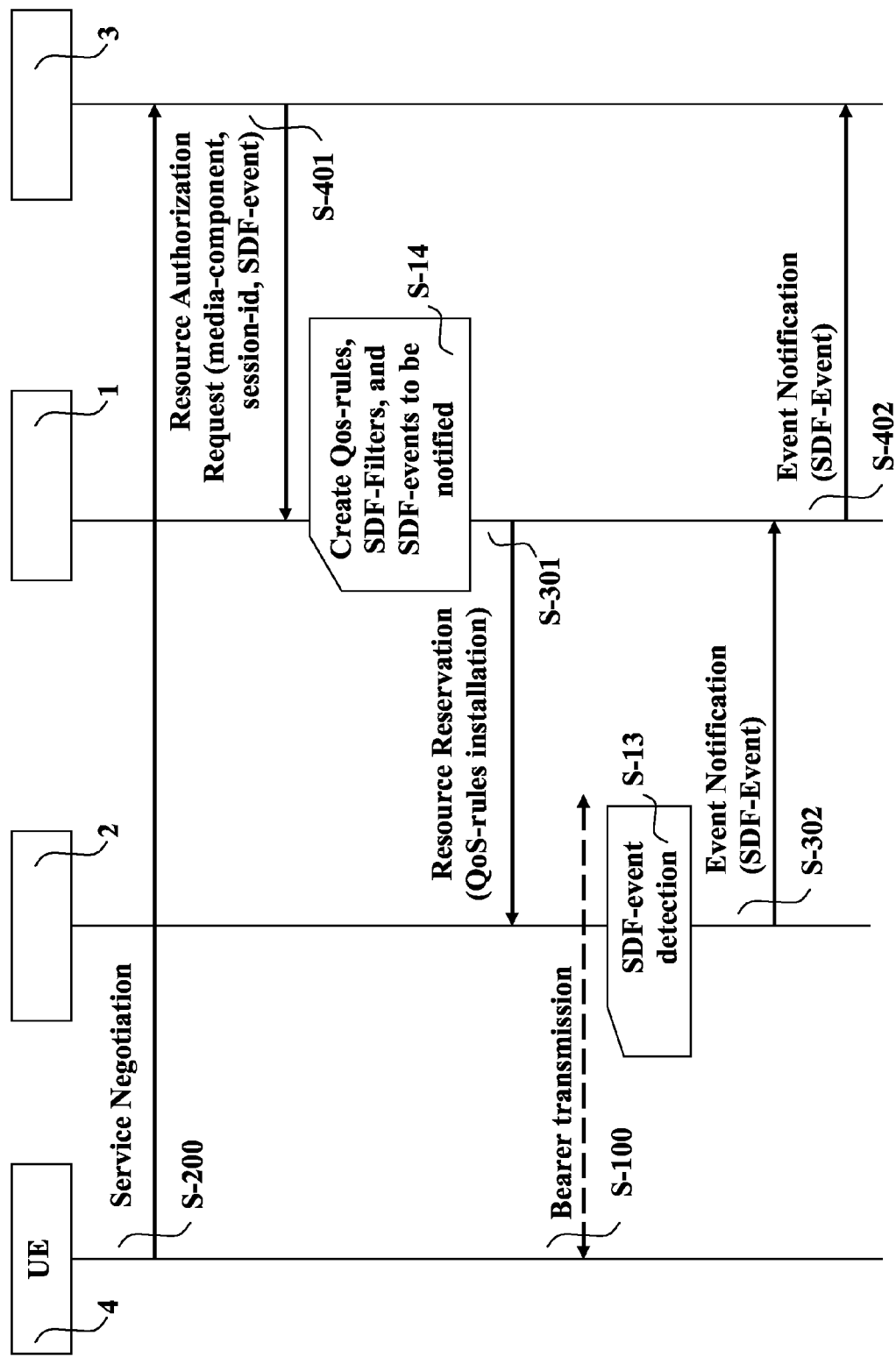
FIG. 4 illustrates a first embodiment of a method to define a list of events to be notified on an SDF basis in a detection function device at the traffic plane; as well as how the detected events are notified towards the signalling layer.

In a first embodiment of the invention illustrated in FIG. 4 and with due regard to FIG. 6-8, the method starts with a step of negotiating S-200 between the UE 4 and the application function device 3 the requirements on quality of service to be guaranteed into the bearer layer.

To this end, the application function device 3 may comprise negotiation means 30 for negotiating with a UE 4 the requirements on QoS to be guaranteed for media transport through the bearer layer. In other embodiments, this negotiation may be carried out between the originating UE 4 and a destination UE 4b; or between the originating UE 4 and another server 6 involved in the signalling layer and thus located at the control plane. In these other embodiments, the application function device may act on behalf of the negotiating entity 6 at the control plane upon reception from such entity of those requirements on quality of service negotiated with the originating UE 4.

Once the application function device 3 is aware of the requirements on quality of service negotiated with the originating UE 4, and by using first output means 23 included therein, the application function submits in step S-401a session identifier session-id identifying the session established with the UE 4, along with a description of negotiated media to a QoS-control function device 1 interposed between the signalling layer and the bearer layer.

Figure 5:
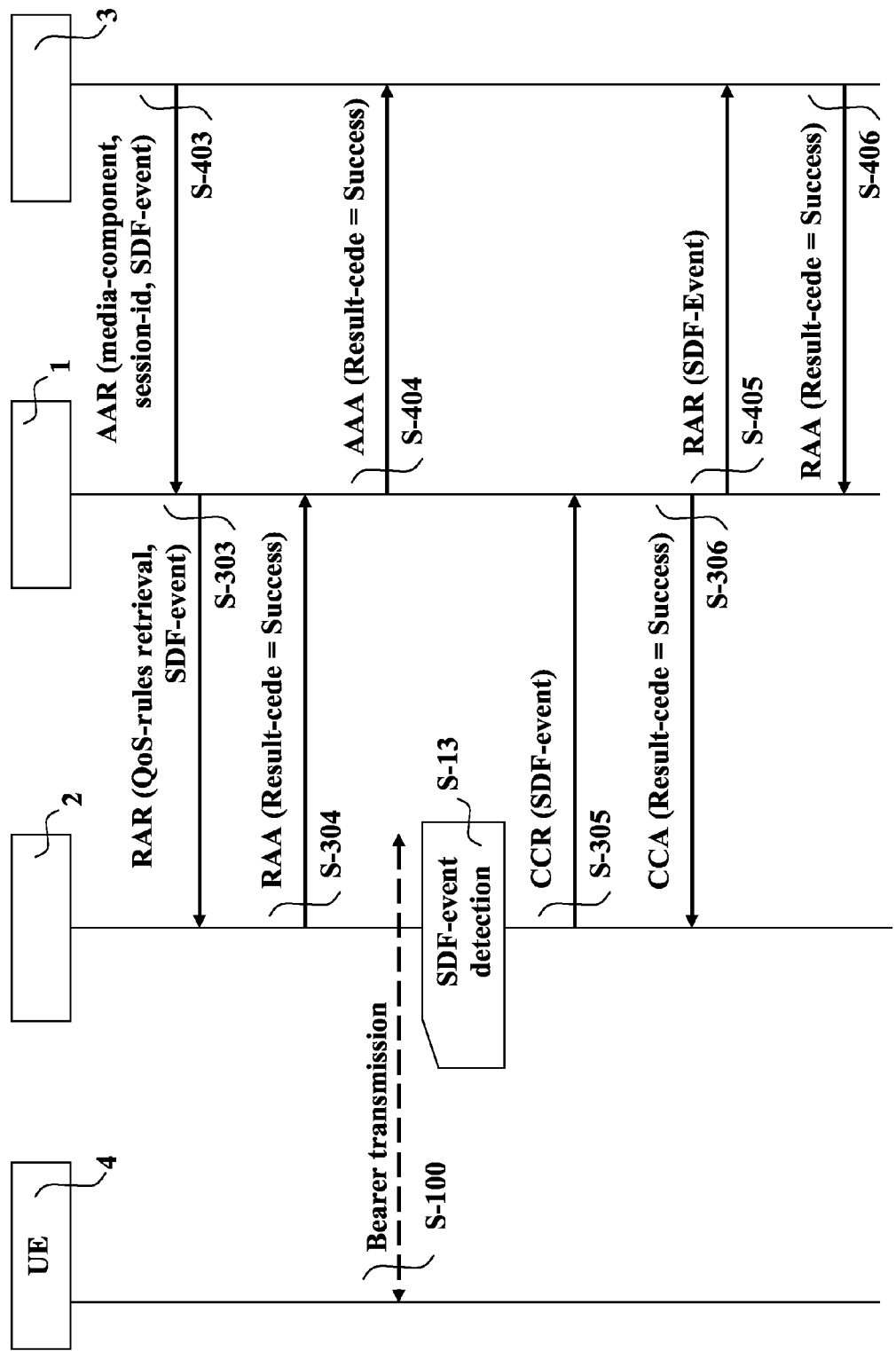
FIG. 5 illustrates a second embodiment of a method to define a list of events to be notified on an SDF basis in a detection function device at the traffic plane; as well as how the detected events are notified towards the signalling layer.

In embodiments of the invention, this first output means 23 may be arranged to send a Resource Authorization Request in step S-401 as illustrated in FIG. 4, or an AAR message in step S-403 as illustrated in FIG. 5, wherein the description of negotiated media is given with media-component parameters and the session is identified with a session identifier session-id. The Table I, following this, illustrates an exemplary description of negotiated media:

TABLE I

Session ID: dfhyrio9011k
Media-Component-Number. 1
Media-Sub-Component
   Flow-Number. 1
      Flow-Description
      Direction: Out (Downlink direction. It is
      to the terminal)
      Source IP address: 144.132.134.67
      Destination IP address: 192.168.186.6
      Protocol: RTF
      Source Ports: 5678
      Destination Ports: 3456
      Flow Status: Enable
      Flow Usage: No information
      Max-Requested-Bandwidth-UL. 0 (Kbps).
      Max-Requested-Bandwidth-DL. 13(Kbps)
   Flow-Number. 2
      Flow-Description
      Direction: Out (Downlink direction. It is
      to the terminal)
      Source IP address: 144.132.134.67
      Destination IP address: 192.168.186.6
      Protocol: RTCP
      Source Ports: 5679
      Destination Ports: 3457
      Flow Status: Enable
      Flow-Description
      Direction: In (Uplink direction. It is
      from the terminal)
      Source IP address: 192.168.186.6
      Destination IP address: 144.132.134.67
      Protocol: RTCP
      Source Ports: 3457
      Destination Ports: 5679
      Flow Status: Enable
   AF-Application-Identifier. Streaming-ID
   Media-Type. AUDIO (0)
   RS-Bandwidth. 3.0 Kbps
   RR-Bandwidth. 3.5 Kbps In this context, the description of negotiated media may adopt the form of service parameters that include requirements on QoS negotiated for a given SDF. The application function device 3 may thus send these service parameters including requirements on QoS negotiated for a given SDF.

In an embodiment of the invention, the application function device 3 may also submit a list of events SDF-events to be notified on an SDF basis. To this end, the first output means 23 in the application function device may be arranged to include the list of events SDF-events in the Resource Authorization Request S-401 or in the AAR message S-403.

However, in other embodiments of the invention this list of events SDF-events on an SDF basis may be configured in other network entities. That is, the list of events may be dynamically created at the application function device 3 or may be configured at the QoS-control function device 1, and this list may be complemented with another list of events on an SDF basis statically configured at a detection function device 2 further described.

The session identifier session-id identifying the session and the description of negotiated media media-component as well as the list of events SDF-events on an SDF basis, if included by the application function device, are received in first output means 20 at the QoS-control function device 1.

In accordance with an embodiment of the invention, the QoS-control function device 1 may determine that the user has a bearer established by correlating in first processing means 50 the description of the negotiated media with service data flows in the bearer layer. Under the embodiment illustrated in FIG. 4, the QoS-control function device 1 may then inform during step S-301 towards a detection function device 2 that QoS-related rules QoS-rules need to be installed for the negotiated media. The QoS-related rules QoS-rules include SDF filters SDF-Filters to allow inspection of individual SDF's in the bearer, and the list of events SDF-events to be notified, both on an SDF basis. For example, as shown in FIG. 4, the installation of QoS-related rules QoS-rules during step S-301 may be triggered with a so-called Resource Reservation message.

In particular, decisions on the QoS-related rules QoS-rules may be based on one or more of the following:

information obtainable from the application function device 3, such as the session identifier, media related information, and user related information;

information obtainable from the detection function device 2, such as bearer attributes, request type and user related information;

information obtainable from an external repository 5, such as user and service related data; and information pre-configured at the QoS-control function device 1.

Different alternative or complementary embodiments turn up at this stage. On the one hand, as FIG. 4 shows, the QoS-control function device 1 may generate in step S-14 those QoS-related rules QoS-rules with the list of events SDF-events on an SDF basis either as received from the application function device 3, or as configured in the QoS-control function device 1.

In accordance with the procedure illustrated in FIG. 4, there is provided a method that comprises a step S-14 of generating Quality of Service related rules, which include service data flow filters and lists of events to be notified per service data flow, at a QoS-control function device 1 located between the signalling layer and the bearer layer; and a step S-301 submitting these Quality of Service related rules towards a detection function device 2 for inspecting media transported through the bearer layer.

Alternatively, the QoS-control function device 1 may further comprise as illustrated in FIG. 7, retrieval means 50 for retrieving from storage 1 the QoS-related rules that include service data flow filters SDF-Filters and lists of events SDF-events to be notified per service data flow; and second output means 12 for submitting these QoS-related rules towards the detection function device 2 for inspecting media transported through the bearer layer. Moreover, this QoS control function device may be implemented so that the retrieval means 50 may include query means carrying out the step S-500 to obtain the QoS-related rules from an external repository 5.

In this respect, the invention provides a step S-301 in the method illustrated in FIG. 4, and a step S-303 in the method illustrated in FIG. 5, of installing Quality of Service related rules and this step may include a step of retrieving said Quality of Service related rules from a storage 1 or 5 accessibly located between the signalling layer and the bearer layer. For example, as shown in FIG. 5, the retrieval of QoS-related rules QoS-rules may be triggered during step S-303 with a so-called RAR message.

Alternatively or complementary to the retrieval means for retrieving from storage the Quality of Service related rules, the QoS-control function device 1 may generate such rules. Therefore, the QoS-control function device 1 illustrated in FIG. 7 may further comprise: second processing means 51 for generating QoS-related rules, including service data flow filters and lists of events to be notified per service data flow; and second output means 12 for submitting the QoS-related rules, including service data flow filters and lists of events to be notified per service data flow, towards the detection function device 2 for inspecting media transported through the bearer layer.

Where the QoS-related rules QoS-rules are generated in step S-14 by second processing means 51 at the QoS-control function device 1, these QoS-related rules are submitted in step S-301 towards the detection function device 2 and received therein via S-300 as illustrated in FIG. 6. To this end, the detection function device 2 may further comprise first input means 13 for receiving the QoS-related rules, which include service data flow filters and lists of events to be notified per service data flow, from the QoS-control function device 1 in charge of guaranteeing into the bearer layer those requirements on quality of service negotiated through the signalling layer.

Alternatively or complementary to the reception of QoS-related rules from the QoS-control function device 1, the detection function device may further comprise configuration means 30 for receiving in a step S-600 the QoS-related rules, including service data flow filters and lists of events to be notified per service data flow, from a provisioning system. That is, the QoS-related rules QoS-rules with the SDF filters on an SDF basis might also be statically configured at the detection function device 2, and installed therein at request, during step S-301 in FIG. 4 or during step S-303 in FIG. 5, from the QoS-control function device 1. The request during step S-303 to install the QoS-related rules might include, as FIG. 5 illustrates, the list of events SDF-event to be notified either as received from the application function device 3, or as configured in the QoS-control function device 1.

Then, the detection function device 2 installs the QoS-related rules QoS-rules on the established bearer. The list of events SDF-events are stored along with SDF filters SDF-Filters on an SDF basis in storage means 54 included in the detection function device 2 for the QoS-related rules QoS-rules as FIG. 6 illustrates. Now, the originating UE 4 can carry out a media bearer transmission S-100 for the service involved.

Once the UE 4 starts sending media S-100, the detection function device 2 performs an inspection of IP flows S-11 and S-12, through the input/output means 55 for transmitting the media at the bearer layer, by using the filtering means 52*a* and 52*b* with the SDF filters (SDF-Filters) on an SDF basis in order to identify each particular SDF.

Where an SDF event in the list of events to be notified on an SDF basis is detected in step S-13 with the detection means 53*a* and 53*b* at the detection function device 2, an event notification is sent during step S-302 in FIG. 4, or during step S-305 in FIG. 5, including the detected SDF event, from second output means 14 in the detection function device 2 towards the QoS-control function device 1. For example, as shown in FIG. 4, the detected event SDF-event on an SDF basis may be notified during step S-302 with a so-called Event Notification message that includes information about such event. Also for example and as FIG. 5 shows, the detected event SDF-event on an SDF basis may be notified during step S-305 with a so-called CCR message.

This notification in steps S-302 or S-305 of an SDF event detected at the detection function device 2 is received in second input means 11 at the QoS-control function device 1, as illustrated in FIG. 7, and may be collected in an event report on an SDF basis. To this end, the QoS-control function device 1 may comprise a processing means 50 adapted for handling SDF events in cooperation with a so called SDF-event Report output means 22 for collecting such event report and for submitting it towards the application function device 3 in the signalling layer.

Nevertheless and irrespective of whether the event report is collected with SDF events notified on an SDF basis, the QoS-control function device 1 receiving in steps S-302 or S-305 the notification of an SDF event detection at the detection function device 2 makes use of its first processing means 50 for determining the application function device 3 to be notified about such detected SDF event and, once the application function device 3 is determined, a corresponding notification is sent in step S-402 as illustrated in FIG. 4, or in step S-405 as illustrated in FIG. 5, with first output means 21 in the QoS-control function device 1 towards the application function device 3 found to be interested in this notification. For example, as shown in FIG. 4, the detected event SDF-event on an SDF basis may be notified during step S-402 with a so-called Event Notification message that includes information about such event. Also for example, and as FIG. 5 shows, the detected event SDF-event on an SDF basis may be notified during step S-405 with a so-called RAR message.

Such notification received in step S-402, or in step S-405 as the case might be, may be received by first input means 24 at the application function device 3, as FIG. 8 illustrates, whereas the event report on an SDF basis, if submitted from the QoS-control function device 1, may be received by second input means 25 at the application function device 3.

This event report may be advantageously used during subsequent negotiations to achieve more accurate results and to better agree on resources to be guaranteed. To this end, the application function device may further comprise means 31 for checking the event report during negotiation with the user equipment of the quality of service to be guaranteed for a subsequent media transport through a bearer layer.

The application function device 3 may make use of each individual SDF event, or of the event report, notified on an SDF basis to update the service parameters to be further taken into consideration in subsequent negotiation of requirements on QoS. Moreover, the application service device 3 may make use of means 31 for checking previously received event reports on an SDF basis during subsequent negotiation of requirements on QoS with the UE 4.

Regarding the operational distribution of cooperating entities provided for by the present invention, and with an eye to possible integration with other existing entities in different scenarios outlined above, the invention further suggests some applicable use of this cooperating entities.

In particular, a P-CSCF server as referred for use in IMS may advantageously be enhanced by including the above application function device. In addition, a GGSN operating in accordance with a GPRS access network, and a PDG operating in accordance with a WLAN access network, both may be enhanced to include the above detection function device.

Also in particular and for more general integration purposes, the invention provides for a Policing and Charging Enforcement Function in accordance with a PCC architecture and including the above detection function device, and for a Policing and Charging Rules Function in accordance with a PCC architecture and including the above QoS-control function device.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A method for guaranteeing into a bearer layer requirements on quality of service negotiated through a signalling layer, the bearer layer being a media transport layer capable of bearing several service data flows, each service data flow including at least one IP flow, the signalling layer being used for signalling how media transported through the bearer layer should be treated, the method comprising the steps of:
- a user equipment negotiating with the signalling layer those requirements on quality of service to be guaranteed for media transport through the bearer layer;
- setting a session identifier along with a description of negotiated media to identify the session between signalling and bearer layers;
- transmitting the media through the bearer layer;
- installing Quality of Service related rules, the rules including service data flow filters and lists of events to be notified per service data flow;
- inspecting IP flows through the media at the bearer layer by using the service data flow filters;
- detecting at the bearer layer when an event to be notified per service data flow occurs for the inspected IP flows; and
- notifying towards the signalling layer about the detected event related to the particular service data flow.

2. The method of claim 1, wherein the step of installing Quality of Service (QoS) related rules includes a step of retrieving the QoS rules from a storage accessibly located between the signalling layer and the bearer layer.

3. The method of claim 1, wherein the step of setting a session identifier along with a description of negotiated media comprises a step of receiving service parameters from an application function device in the signalling layer, the service parameters including requirements on quality of service negotiated for a given service data flow, and a list of events to be notified per service data flow.

4. The method of claim 1, further comprising the steps of:
- generating Quality of Service related rules, including service data flow filters and lists of events to be notified per service data flow, at a QoS-control function device; and
- submitting the Quality of Service related rules, including service data flow filters and lists of events, to a detection function device for inspecting media transported through the bearer layer.

5. The method of claim 1, wherein the step of notifying about the detected event includes the steps of:
- notifying a QoS-control function device the detection at a detection function device of an event in the list of events to be notified for a service data flow;
- determining the application function device to be notified about the detected event; and
- notifying the application function device in the signalling layer about the detected event related to the particular service data flow.

6. The method of claim 5, further comprising a step of collecting in an event report submitted from the QoS control function device to the application function device those events notified per service data flow from the detection function device.

7. The method of claim 6, further comprising a step of dynamically updating at the application function device the service parameters as a result of the event report.

8. The method of claim 1, further comprising a step of dynamically updating at the application function device the service parameters as a result of those events notified per service data flow.

* * * * *

UNITED STATES PATENT AND TRADEMARK OFFICE
CERTIFICATE OF CORRECTION

| | | |
|---|---|---|
| PATENT NO. | : 7,940,659 B2 | Page 1 of 1 |
| APPLICATION NO. | : 12/303241 | |
| DATED | : May 10, 2011 | |
| INVENTOR(S) | : Avila Gonzalez et al. | |

It is certified that error appears in the above-identified patent and that said Letters Patent is hereby corrected as shown below:

In Column 1, Line 43, delete "UBE" and insert -- UE, --, therefor.

In Column 2, Line 53, delete "AF," and insert -- AF --, therefor.

In Column 6, Line 55, delete "S-401a" and insert -- S-401 a --, therefor.

In Column 7, Line 10, in Table I, delete "RTF" and insert -- RTP --, therefor.

In Column 12, Line 19, in Claim 6, delete "QoS control" and insert -- QoS-control --, therefor.

Signed and Sealed this
Thirtieth Day of August, 2011

David J. Kappos
*Director of the United States Patent and Trademark Office*